April 15, 1952   R. L. OHMSTEDE   2,592,946
TUBE CUTTING MACHINE
Filed Oct. 4, 1950   3 Sheets-Sheet 1
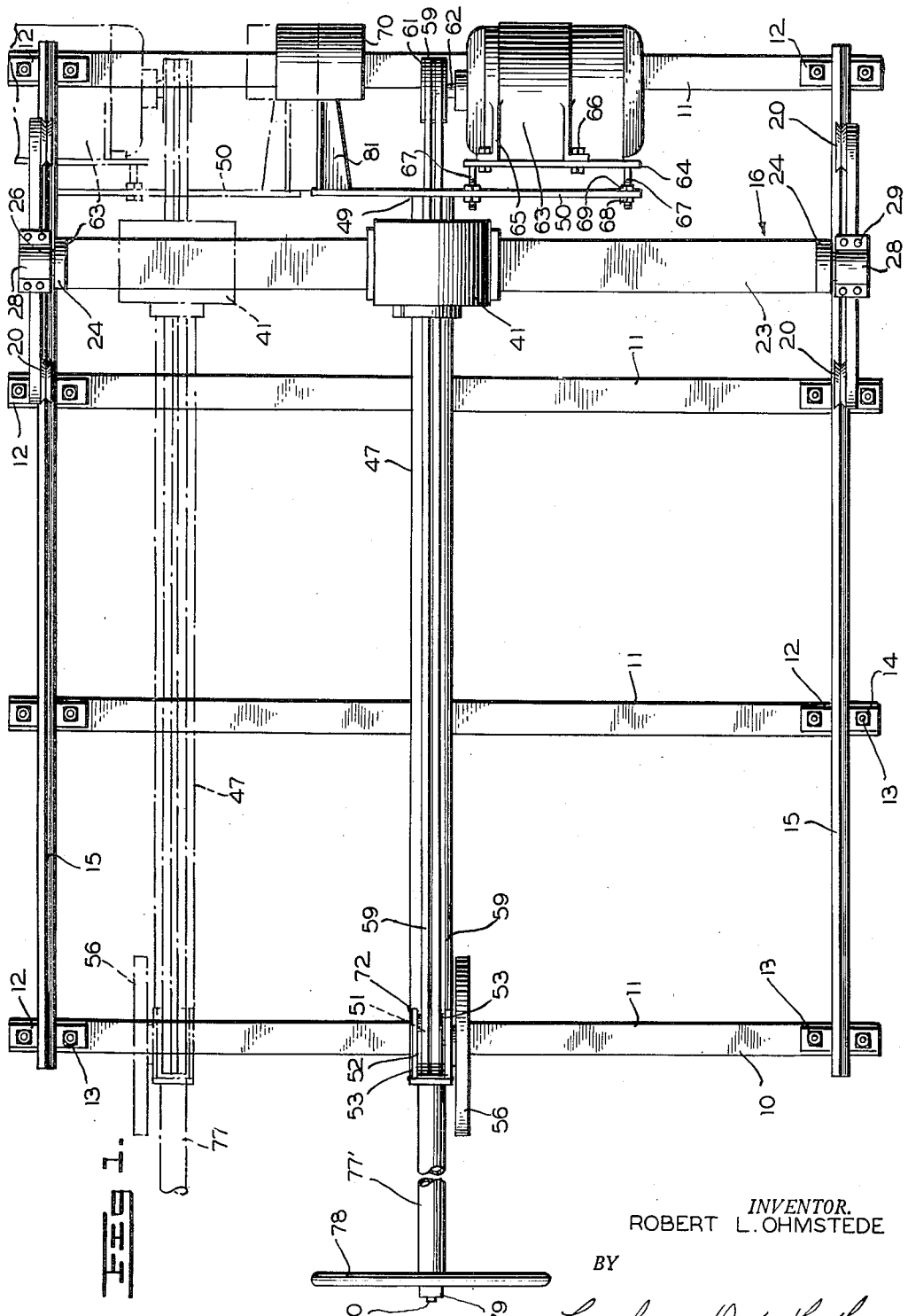
INVENTOR.
ROBERT L. OHMSTEDE
BY
ATTORNEYS

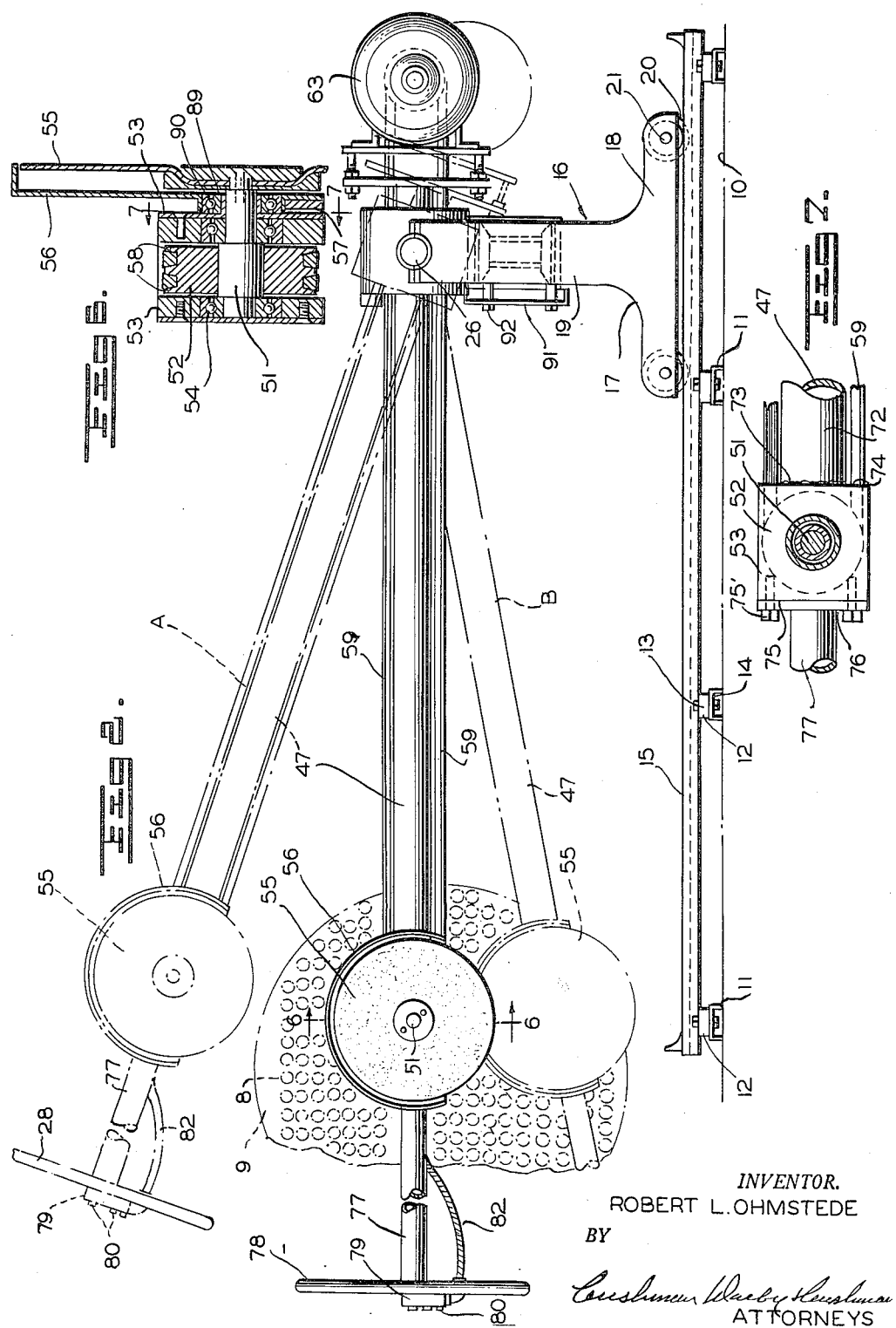

April 15, 1952     R. L. OHMSTEDE     2,592,946
TUBE CUTTING MACHINE
Filed Oct. 4, 1950     3 Sheets-Sheet 3
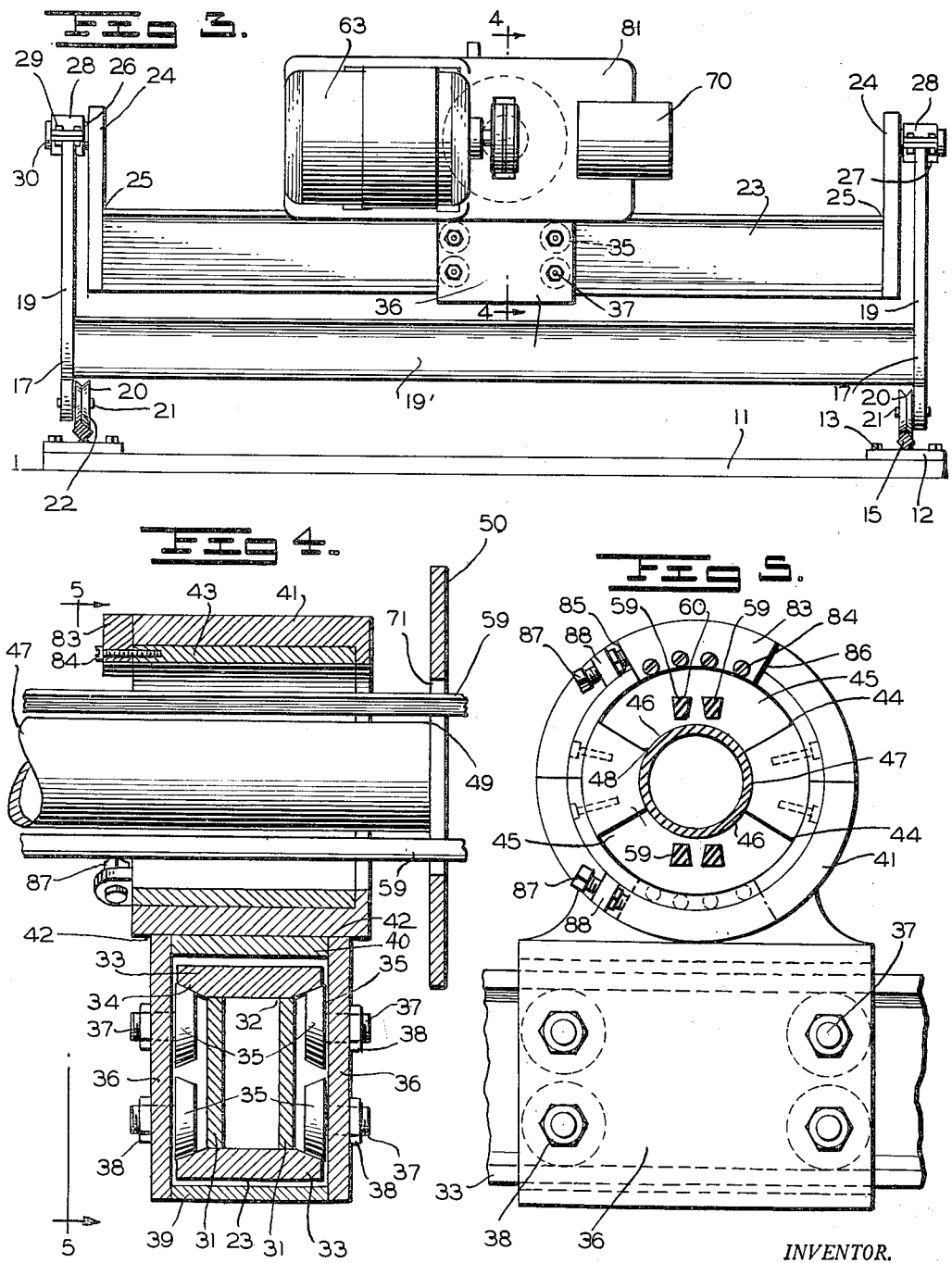
INVENTOR.
ROBERT L. OHMSTEDE
BY
ATTORNEYS Patented Apr. 15, 1952

2,592,946

UNITED STATES PATENT OFFICE 2,592,946

TUBE CUTTING MACHINE

Robert L. Ohmstede, Beaumont, Tex., assignor to Ohmstede Machine Works, Beaumont, Tex., a partnership Application October 4, 1950, Serial No. 188,396

12 Claims. (Cl. 51—170)

The present invention relates to a cutting machine and, more particularly, to improved means so constructed and arranged as to perform various cutting and slicing operations in an expeditious and satisfactory manner.

An important object consists in providing a cutting machine with means for slicing tube bundles and the like. Heretofore, heat exchangers have been extensively used in refineries and similar industries and from time to time the tubes have to be replaced or the parts dismantled. It has always been a major and serious problem to remove the longitudinally spaced floating tube sheets or supporting plates from the tube bundle in such heat exchange devices. While many methods have been used and are being used to remove the floating tube sheets, these methods have been found laborious, slow and expensive. Accordingly, an important object consists in providing a cutting machine with simple, efficient and positive means for quickly cutting or slicing all of the tubes of a bundle of tubing regardless of the metal or composition of the tubes and at a substantial saving in time and labor as compared to the means heretofore used.

A further object consists in providing a cutter or abrasive member with means for rotatably supporting the cutting instrumentalities, so that the same may be turned on a horizontal axis through substantially 180° in order that the opposing ends of the tube may be cut and at points close to the adjacent floating tube sheet and baffle. Additionally, means are provided for insuring the rotation of the cutter or abrasive tool in a direction that throws the sparks and cuttings away from the operator.

Other objects and advantages of the invention will become apparent from the following description when taken in conjunction with the accompanying claims and drawings.

Referring to the drawings in which is shown a preferred embodiment the invention may assume:

Figure 1 is a plan view of a cutting machine constructed in accordance with the present invention.

Figure 2 is a side elevational view of Figure 1 showing in dotted lines a bundle of tubes and the cutter in two of its extreme positions.

Figure 3 is a rear end view of the machine.

Figure 4 is an enlarged sectional view taken substantially along the line 4—4 of Figure 3.

Figure 5 is a sectional view taken substantially along the line 5—5 of Figure 4.

Figure 6 is a detail sectional view taken substantially along the line 6—6 of Figure 2, and Figure 7 is a sectional view taken substantially along the line 7—7 of Figure 6.

Referring to the drawings, 10 designates a fixed supporting frame or base comprising transversely spaced channel bars 11 having secured to their opposed ends, tie plates 12 by the threaded bolts 13 and nuts 14. Suitably secured to the plates 12 and extending longitudinally of the frame are a pair of parallel guide rails or trackways 15 which, as shown, are substantially diamond-shape (Fig. 3) but which may be of any other suitable configuration. The frame 10 is of such size and is so constructed as to be positioned to one side of the work, such as a bundle of heat exchange tubes 8 (Fig. 2) that are to be cut or removed from a tube bundle 9 at points close to the transversely disposed floating tube sheets and baffles. A carriage, generally indicated 16, preferably comprises a pair of parallel spaced headers 17 (Fig. 3), each having a lower horizontal portion 18 and a centrally and upwardly disposed arm 19 (Fig. 2). Guide wheels 20 are rotatably mounted on shafts 21 carried by the outer ends of the horizontal arms 18 and these wheels are preferably provided circumferentially with V-shaped grooves 22 so as to engage the complementary surfaces of the guide rails 15. The arms 19 may be connected above the wheels 20 by a transverse member 19'.

Extending transversely between the arms 19 of the carriage is a pivotal member preferably in the form of an I-beam 23 (Fig. 3) connected at its ends to vertically disposed parallel side members or arms 24 in any suitable manner, such as by welding as at 25. Extending laterally and outwardly from each of the arms 24 is a trunnion or shaft 26 secured to the upper end of an arm 19 by the flanged clamp or bearing members 27 and 28 which may be secured together by the bolts 29. The outer ends of each of the trunnions 26 may be provided with an annular flange 30 arranged to engage the adjacent side of the clamping members when the parts are assembled so as to allow rotation of the trunnions but which acts to retain the transverse member 23 and its associated parts on the carriage. Preferably, the I-beam 23 is formed of a pair of vertically spaced parallel members or plates 31 (Fig. 4) to which are welded as at 32 spaced horizontal members or plates 33 having their opposed inner sides tapered as at 34 so as to engage complementary formed rollers 35 which are secured to spaced parallel vertical plates or arms 36 by the threaded bolts 37 and retaining nuts 38, which extend outside of the members 33 so as to enclose the same and the vertical members 31. The lower ends of the members 36 are connected by a transverse bottom member 39 and are also connected at their upper ends by a transverse member 40 so as to extend completely around the I-beam 23. The members 36, 39 and 40 constitute a movable housing or support for a tubular bearing member or casing 41 (Fig. 4) which at its lower end is welded as at 42 to the top of the plate 40 and the side members or plates 36 so as to constitute a unitary structure that may be moved bodily longitudinally of the I-beam 23 and which is guided and assisted in its movement by the rollers 35 that engage the complementary surfaces of the members 33. The tubular or hollow casing 41 has rotatably mounted therein a ring or sleeve 43 to which is welded as at 44 spaced segmental radial plates 45 which have curved conforming inner sides 46 that are welded to the outer surface of a tubular column or bar 47 as at 48; and which extends through the casing 41 at substantially right angles to the I-beam 23 and has its inner end welded or otherwise connected as at 49 (Fig. 1) to a vertical plate 50. The opposite or outer end 72 of the shaft 47 preferably has extending laterally therefrom a pin or shaft 51 on which is keyed a pulley 52 (Fig. 6). The pulley 52 is preferably disposed between spaced guard members or side plates 53 which are rotatable on the ball bearings 54 mounted on the shaft 51. The outer end of the shaft 51 is keyed or otherwise non-rotatably connected to a cutting tool such as a blade or slicer 55. Also, rotatably mounted on the shaft 51 is a blade guard 56 to which is connected a counterweight 57. The pulley 52 has spaced annular V-shaped grooves 58 arranged to receive a pair of endless V-shaped belts 59 which extend through complementary openings 60 (Fig. 5) in the plates 45 and pass over a similar shaped drive pulley 61 (Fig. 1) connected by the shaft 62 to a reversible motor 63 mounted on a plate 64 by the bracket arm 65 and bolt 66. The plate 64, in turn, is secured to the plate 50 by the adjustable threaded bolts 67 and the clamping nuts 68 and 69 positioned on opposite sides of the plate 50. The motor 63 is positioned on one side of the column 47 and the plate 50 may extend transversely of the column and have connected to its opposite side, a counterweight 70 by a supporting bracket 81 (Fig. 1) so as to provide means for balancing the movement of the column 47 and its associated parts during the cutting operation. The plate 50 is provided centrally with an opening 71 through which the parallel portions of the belt 59 pass during the operation of the cutter (Fig. 4). Preferably, the column 47 is interposed between the upper and lower portions of the endless belt 59, as particularly shown in Figure 5, so as to reduce the width of the column 47. Manifestly, the cutting tool or abrasive wheel 55 may be operatively connected to the motor by a belt drive or other suitable means without departing from th spirit of the invention and may be conveniently moved to any desired position so as to efficiently cut the work.

Preferably, the outer end 72 of the operating column or bar 47 (Fig. 7) is welded or otherwise secured as at 73 to a transverse end plate 74 connected to the parallel plates 53 so as to constitute an integral part thereof. The opposite ends of the plates 53 may be connected to a transverse end plate 75 by the bolts 75' and the plate 75 may be welded as at 76 to an operating shaft 77 that constitutes a continuation of the column 47 and is arranged to be manually actuated to control the movement of the same. To the outer free end of the shaft 77 is suitably connected a steering wheel 78 and also a switch sleeve or housing 79 having three push button switch contacts 80 connected by the flexible cable 82 to the motor 63 for controlling the forward and reverse direction and also the stopping of the cutter 55 during the operation of the machine. It will be noted that the shaft 47 is connected by the segmental members 45 to the rotatable member 43 in the housing 41 so as to be revoluble on a longitudinal axis relative to the fixed housing 41 by turning of the wheel 79. In order to limit the rotatable movement of the column or shaft 47 through substantially 180°, the rotatable member 43 has secured to the outer face thereof a segmental stop member 83 by the screws 84, and has its opposite ends 85 and 86 (Fig. 5) arranged alternately to engage adjustable circumferentially spaced stops 87 and 87'. Each of these stops is threaded on a fixed lug 88 carried by the housing 41. Thus, it will be seen that rotation of the wheel 78 will simultaneously impart a rotary movement to the shaft 47, inner sleeve 43, motor 63 and their associated parts so as to transfer the cutter 55 from one side of the column 47 to the opposite side thereof without interfering with the operation of the cutter. The guard plate or shield 56 may be rotatably mounted on the hub 89 (Fig. 6) of the inner guard plate 53 through a ball bearing support 90. It will be seen that as the cutter blade 55 is swung from one side of the column 47 to the opposite side thereof, the counterweight 57 will cause the shield 56 to cover the blade. A guard 91 (Fig. 2) may be connected by the threaded bolts 92 to the front side of the arms 19 of the carriage 16 so as to provide a shield for the carriage and its associated parts during the operation of the machine.

In operation, assuming that a tube bundle, such as 9, is provided with longitudinal tubes 8 supported by baffles and floating and stationary tube sheets, and is arranged in bundles in the conventional manner and it is desired to cut the tubes into sections or at their ends so as to facilitate the removal of the floating tube sheets, the frame 10 is positioned to one side of the heat exchanger 9 (Fig. 2) so that the carriage 16 may be moved toward and away from the tubes 8 from the side thereof. The operator then grasps the control wheel 78 so as to move the carriage 16 on the track 15 toward the exchanger 9 in order that the peripheral teeth on the cutting tool 55 will be in proper position to commence cutting transversely the bundle of pipes adjacent the floating tube sheet. The column 47 is initially raised to the dotted line position A, as shown in Figure 2, and then the operator moves the starting switch so as to cause the cutter to be operated by the motor 63. The cutting of the tubes is initiated by the operator depressing the control wheel 78 which causes the transverse member 23 to rotate about its pivot bearings 26. Thus, the movable support 36, housing 41, column 47 and their associated parts are tiltable about the pivots 26 so as to swing the cutting tool 55 arcuately in a vertical path relative to the work (Fig. 2). The peripheral cutting continues until the tool 55 is moved downwardly a predetermined distance or reaches its hub, then the operator lifts the column 47 and its associated parts about its fulcrum and this operation is repeated until it has cut across the diameter of the bundle of tubes as indicated at B in Figure 2. The operator then rotates the column 47 until the cutting tool 55 is moved substantially 180° from its original position and is disposed on the opposite side of the column as indicated in dotted lines in Figure 1. During this movement, the segmental plate 45 and stop member 83 are rotated from the position shown in full lines in Figure 5 so as to bring the side 86 of the stop 83 into abutting engagement with the stop 87', thus limiting the rotative movement of the column 47 and its associated parts, at the same time the guard 56 is automatically moved by the weight 57 to cover the blade 55. The operator then proceeds to cut this end of the tube in exactly the same manner as the first cuts were made and to rotate the tool so that the sparks and cuttings are thrown in a direction away from the operator. The short sections of tubes after being cut into at points adjacent to tube sheet and nearest baffles, are removed, and the cutting operation is made progressively lower, until the floating tube sheet is cut free from the rest of the bundle. The remaining tubes can then be driven out of the stationary tube sheet and baffles by means of an air hammer or another suitable device. In this connection, it might be mentioned that while many methods have been used for removing the floating tube sheet such as cutting the tubes with a chisel and burning with an oxyacetylene cutting torch or electrical arc, and an internal type tube cutter where each tube is cut individually by a cutter revolving inside of the tube, all of these methods have been found laborious, slow and expensive, as constrasted to applicant's cutter which will slice the tubes regardless of their composition in a fraction of the time previously required.

It will be understood that the form of the invention shown is merely illustrative and that such changes may be made as come within the scope of the following claims.

I claim:

1. A cutting machine of the class described including in combination, a guide frame, a carriage movable on the frame to and from one side of the work, said carriage having spaced headers, a tiltable transverse member pivotally connected at its ends to said headers, a supporting member slidably connected to said transverse member, an operating member rotatably mounted on said supporting member and extending transversely thereof, a motor connected to one end of said operating member, a cutting tool connected to the opposite end of the operating member, and means operatively connecting said motor to said cutting tool, said operating member being operable to move the carriage on the guide frame relative to the work and for tilting said members in a vertical direction to control the position of the tool relative to the work.

2. A cutting machine of the class described including in combination, a guide frame, a carriage movable on the frame to and from one side of the work, said carriage having spaced headers, a tiltable transverse member pivotally connected at its ends to said headers, a supporting member slidably connected to said transverse member, an operating column rotatably mounted on said supporting member and extending transversely thereof, a motor connected to one end of said column, a cutting tool connected to the opposite end of the column, means operatively connecting said motor to said cutting tool, and a handle connected to the column for moving the carriage on the frame relative to the work and for tilting said transverse member to move the cutting tool arcuately in a vertical direction relative to the work and for rotating the column, motor, and tool so as to move the tool to a cutting position on either side of the column.

3. A cutting machine as called for in claim 2 in which means are provided for limiting the rotation of the operating column through substantially 180°.

4. A cutting machine as called for in claim 1 in which means are provided for balancing the motor and operating member on the carriage.

5. A cutting machine of the class described including in combination, a guide frame, a carriage movable on the frame to and from one side of the work, said carriage having spaced headers, a tiltable transverse member pivotally connected at its ends to said headers, a supporting member slidably connected to said transverse member, an operating member rotatably mounted on said supporting member and extending transversely thereof, a plate connected to one end of said operating member and extending transversely thereof, a motor connected to the plate on one side of the operating member, a counterweight connected to the plate on the opposite side thereof, a cutting tool connected to the opposite end of the operating member and extending laterally therefrom, means operatively connecting the motor to said cutting tool, and spaced means on said supporting member for limiting the rotative movement of said operating member, said operating member being operative to move the carriage on the guide frame relative to the work and for tilting said members in a vertical direction to control the position of the tool relative to the work and also for moving the tool to a cutting position on either side thereof.

6. A cutting machine as called for in claim 5 in which means are provided for controlling the direction of rotation of the cutting tool by the motor.

7. A cutting machine of the class described including in combination, a fixed frame having spaced parallel trackways, a carriage movable on said trackways to and from one side of the work, said carriage having spaced upwardly extending headers, a transverse member pivotally connected at its ends to said headers, a supporting member movable lengthwise of said transverse member, means slidably connecting said supporting member to said transverse member, an operating column rotatably mounted on said supporting member and extending transversely thereof, a motor connected to one end of said column adjacent the carriage, a cutting tool extending laterally from the opposite end of the column, means operatively connecting said motor to said cutting tool, and a handle connected to the column in front of said tool for moving the carriage toward and away from the work and for rotating said transverse member to move the cutting tool arcuately in a vertical direction relative to the work and for rotating the column, motor and tool so as to move the motor and tool to either side of the column.

8. A cutting machine as called for in claim 7 in which a counterweight is associated with the motor so as to balance the column and tool during the operation of the machine.

9. A cutting machine as called for in claim 7 including a manually operable handle for rotating the column, motor and tool, and means connected to the handle and the motor for controlling the rotation of the tool so that it will revolve away from the operator.

10. A cutting machine as called for in claim 7 in which means are provided for insuring the rotation of the tool in a direction always away from the operator of the machine.

11. A cutting machine of the class described including a carriage movable toward and away from the work, said carriage having spaced vertically disposed headers, a transverse member between said headers and pivotally connected thereto, a supporting member movable longitudinally on said transverse member, an operating member connected to said transverse member and extending outwardly therefrom, a cutter revolubly mounted on said operating member, and means for rotating said cutter.

12. A cutting machine of the class described including a carriage movable toward and away from the work, said carriage having spaced vertically disposed headers, a transverse member between said headers and pivotally connected thereto, a supporting member movable longitudinally on said transverse member, an operating member rotatably mounted on said transverse member, a cutting tool connected to said operating member, and means for rotating said tool, said operating member being operative to move the carriage on the transverse member and for tilting said members in a vertical direction to control the position of the tool relative to the work and also for moving the tool to a cutting position on either side of the operating member.

ROBERT L. OHMSTEDE.

REFERENCES CITED

The following references are of record in the file of this patent:

UNITED STATES PATENTS

| Number | Name | Date |
| --- | --- | --- |
| 161,951 | Gunn et al. | Apr. 13, 1875 |
| 1,044,423 | Rosa | Nov. 12, 1912 |
| 1,413,928 | Mummert et al. | Apr. 25, 1922 |
| 1,442,381 | Bole | Jan. 16, 1923 |
| 1,800,307 | Marschke et al. | Apr. 14, 1931 |
| 1,958,734 | Woodsmall | May 15, 1934 |
| 2,244,586 | Venable | June 3, 1941 |